United States Patent [19]
Phillips

[11] Patent Number: 5,273,072
[45] Date of Patent: Dec. 28, 1993

[54] FLOW PASSAGES FOR CONTROL VALVES
[75] Inventor: Edward H. Phillips, Troy, Mich.
[73] Assignee: Techco Corporation, Troy, Mich.
[21] Appl. No.: 841,389
[22] Filed: Feb. 24, 1992
[51] Int. Cl.$^5$ .............................................. F15B 13/16
[52] U.S. Cl. ............................ 137/625.23; 91/375 R; 91/375 A
[58] Field of Search ....................... 137/625.21, 625.22, 137/625.23, 625.24; 91/375 A, 375 R

[56] References Cited
U.S. PATENT DOCUMENTS

| | | | |
|---|---|---|---|
| 4,460,016 | 7/1984 | Haga | 137/625.24 |
| 4,561,516 | 12/1985 | Bishop et al. | 91/375 A X |
| 4,624,283 | 11/1986 | Futaba | 91/375 A X |
| 4,924,910 | 5/1990 | Tabata | 91/375 A |

Primary Examiner—Gerald A. Michalsky
Attorney, Agent, or Firm—Gifford, Groh, Sprinkle, Patmore and Anderson

[57] ABSTRACT

The present invention is directed to providing an improved control valve having input and return flow passages that are hydraulically-balanced by virtue of each having a similar flow configuration for fluid flow therethrough. The input and return flow passages are formed to define input and return flow control orifices, respectively, configured for minimizing the possibility of the jet flow issuing from either input or return flow control orifices from impinging upon a surface in juxtaposition to the flow control orifice itself. Thus, the possibility of partial "flow back" into the flow control orifice is eliminated which, in turn, also prevents any significant reduction in the flow control orifice area.

8 Claims, 3 Drawing Sheets

FLOW PASSAGES FOR CONTROL VALVES

BACKGROUND AND SUMMARY OF THE INVENTION

The present invention relates generally to control valves of the type commonly utilized in vehicular power steering systems and, more particularly, to such control valves having hydraulically balanced flow passages wherein input flow pressure loss through the input flow control orifices is substantially identical to return flow pressure loss through the return flow control orifices.

In power steering systems, it is desirable for the control valve to incorporate a "hydraulically balanced" design wherein the pressure loss associated with input flow is substantially equal to the pressure loss associated with return flow for virtually all valve displacement values. According to such a balanced arrangement, the control valve is capable of providing superior performance characteristics while concurrently minimizing parasitic power losses. However, most control valves used in conventional vehicular power steering systems are not hydraulically balanced, but rather are constructed in a "geometrically" balanced manner since the direction of fluid flow through the input and return flow control orifices are opposite with respect to one another. By way of example, the power steering valves described in SAE Paper 880707 and entitled 1988 "LINCOLN CONTINENTAL VARIABLE-ASSIST POWER STEERING SYSTEM" and U.S. Pat. No. 4,651,551 entitled "MEANS FOR MANUFACTURING COMPONENTS OF ROTARY VALVES", issued to Bishop et al. on Mar. 24, 1987 have input and return flow control orifices that are formed by the tangential spaces that open between the chamfered edges of the valve spool slots and the nominally orthogonal edges of the valve sleeve slots. As is known, the edges of the valve spool slots are chamfered to selectively modify flow characteristic and, more particularly, to minimize audible "hissing" noise. Due to the oppositely directed fluid flow through the input and return flow control orifices, the boundaries (i.e., "streamlines") of the fluid jets issuing therefrom differ significantly.

In most conventional control valves, the fluid entering the control valve flows through the input flow control orifices from inlet slots and is channeled by the confluence of the edge chamfers and a circumferential surface to first and second sets of output slots. Concurrently, the flow returning from the first and second sets of output slots passes through the return flow control orifices and into the return slots. When utilized, the chamfered edges of the valve spool slots are geometrically identical to each other. Thus, the fluid jets issuing from the slots formed in the valve spool issue freely into the slots formed in the valve sleeve. However, the fluid jets issuing from the valve sleeve slots do not issue freely into the valve spool slots. Rather, the resulting fluid jet impinges upon the chamfered edges of the valve spool slots at a position and intensity determined as a function of the degree of tangential valve deflection between the valve spool and valve sleeve. This action results in a flow condition wherein partial "flow back" into the flow control orifice occurs which detrimentally reduces its overall working area.

Accordingly, the present invention is directed to providing an improved control valve having flow passages that are substantially "hydraulically balanced" by virtue of each having a similar flow configuration for fluid flow through the input and return flow control orifices. According to a first preferred construction of the control valve, the flow passages are formed with slot walls that serve to configure the flow control orifices with nominally uniform converging angles. This construction serves to substantially inhibit the jet flow issuing from either input or return flow control orifice from impinging upon a surface in juxtaposition to the flow control orifice itself. Thus, the possibility of partial "flow back" into the flow control orifice is eliminated which, in turn, also prevents any undesirable reduction of the flow control orifice area.

In an another preferred embodiment of the present invention, a novel method of forming valve sleeve slots is presented. According to this method, the valve sleeve slots are formed as portions of elongated cylindrical bores formed in a valve sleeve blank in a manner similar to the chambers of a revolver. After the cylindrical bores are formed, an intermediate bore and a counterbore are formed within the valve sleeve blank. The intermediate bore laterally exposes the bores leaving only the valve sleeve slots while the counterbore serves to terminate the axial extent of the slots. A sealing ring is inserted in the counterbore and an enlarged uniform final bore is formed through both the valve sleeve blank and sealing ring to complete the inside configuration of the valve sleeve assembly.

Other features, objects and advantages of the present invention will become readily apparent to one skilled in the art upon analysis of the following written description taken in conjunction with the accompanying drawings and appended claims.

DETAILED DESCRIPTION OF THE PREFERRED EMBODIMENTS

With particular reference to the drawings, an improved valving sub-assembly 10 is shown to include a valve spool 12 and a valve sleeve 14 (shown in phantom in its normally "centered" position surrounding valve spool 12). As will be appreciated, the specific physical construction of valving sub-assembly 10 is merely exemplary in nature such that valving sub-assembly 10 can be readily adapted for use in virtually any conventional vehicular power steering system having a four-way control valve. Thus, a control valve formed with an axial configuration (as opposed to the rotary type depicted in FIG. 1) could likewise be simply modified according to the teachings of the present invention. An example of a control valve suitable for incorporation of valving sub-assembly 10 therein is shown and described in U.S. Pat. No. 4,460,016 entitled ROTARY SERVO-VALVE by Haga et al. which issued on Jul. 17, 1984, the disclosure of which is expressly incorporated by reference herein.

Figure 1:
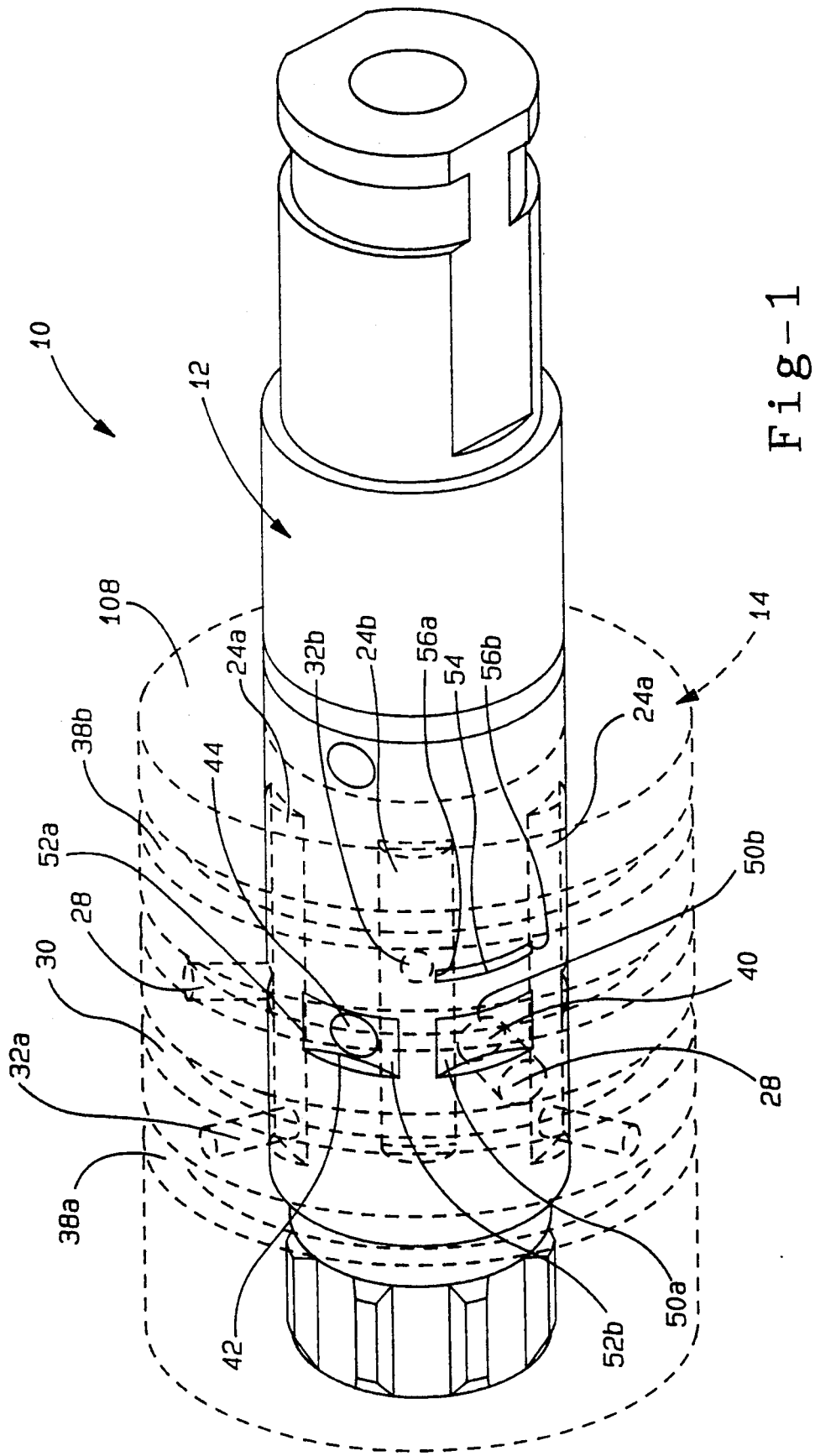
FIG. 1 is a perspective view of an improved valving sub-assembly of a control valve showing the relative positioning and size of the input, return, parasitic and output slots, associated therewith according to a first embodiment of the present invention.
Figure 2:
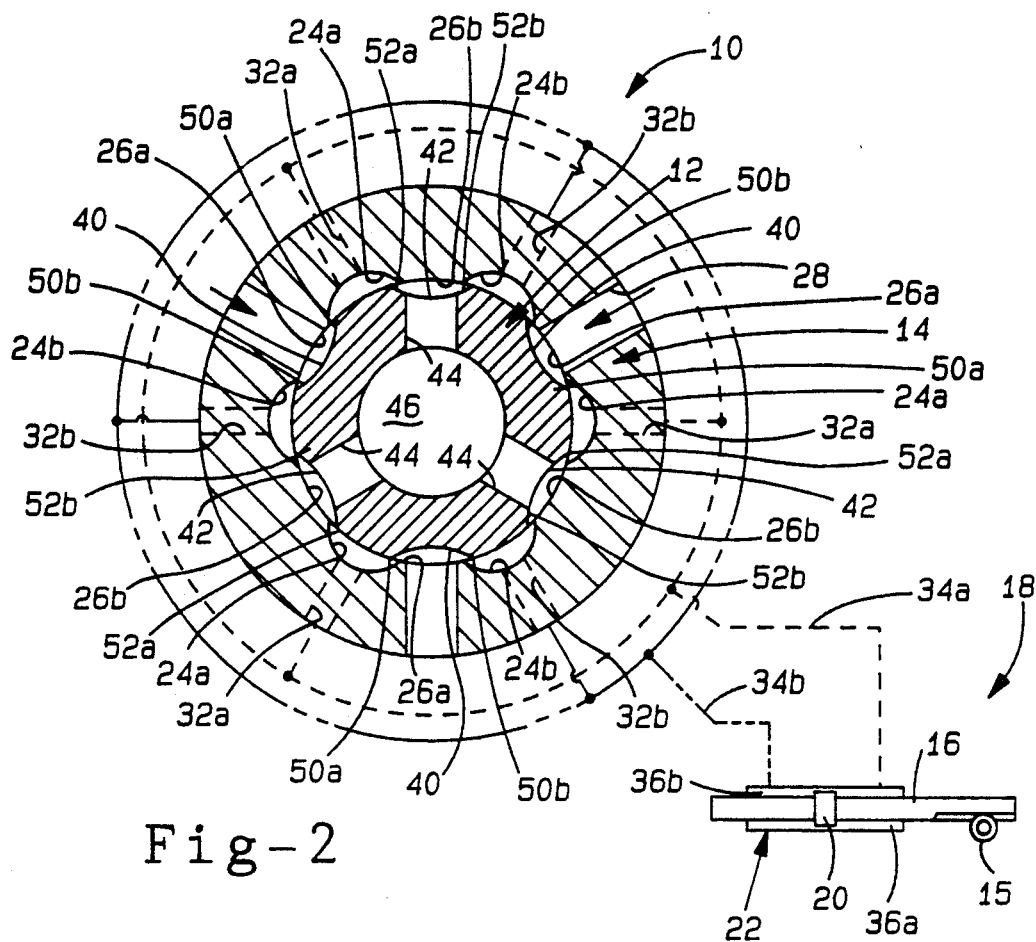
FIG. 2 is a sectional view illustrating the improved valving sub-assembly of FIG. 1.

With particular reference now to FIGS. 1 and 2, improved valving sub-assembly 10 of the type adapted for use in a four-way control valve of a vehicular power steering control apparatus is disclosed. While shown to be of an "open-center" construction, it is to be understood that the principle embodiments in this application are equally adapted for use in "closed-center" control valves. Valving sub-assembly 10 includes valve sleeve 14 and valve spool 12 received therein, and which are rotatable with respect to each other within the control valve. As is known, the rotational position of valve sleeve 14 is coupled to a pinion shaft 15 which is supported within the host vehicle's power steering control apparatus and which is meshingly coupled with a rack shaft 16 of a power steering piston/rack assembly 18. As is also known, the opposite ends of rack shaft 16 are operably connected to the host vehicle's dirigible wheel assemblies via suitable steering linkage mechanisms in a conventional manner. As is schematically shown in FIG. 2, rack shaft 16 is operably connected to a piston 20 that is movable within a power cylinder 22 of piston/rack assembly 18.

Valve sleeve 14 includes a plurality of axially extending valve slots 24 formed circumferentially about its inner surface thus defining lands 26 between adjacent valve slots 24. For clarify purposes, the alternating valve slots 24 are hereinafter referred to as first and second valve output slots 24a and 24b, respectively, while the alternating lands are hereinafter referred to as first and second lands 26a and 26b, respectively. Supply or input ports 28 are formed through first lands 26a which fluidly communicate with a housing pump port (not shown) formed in the control valve housing via an annular groove 30 formed in the exterior surface of valve sleeve 14. In addition, first and second output ports 32a and 32b, respectively, are formed in valve sleeve 14 and open at the bottom of first and second valve output slots 24a and 24b, respectively, and communicate with load lines 34a and 34b, respectively. Output ports 32a and 32b are in fluidly communication with left and right chambers 36a and 36b, respectively, of power cylinder 22 via load lines 34a and 34b, respectively. More specifically, radial output ports 32a and 32b are fluidically coupled to their respective load lines 34a and 34b via annular output grooves 38a and 34b via annular output grooves 38a and 38b, respectively, formed in valve sleeve 14 and their respective distribution ports (not shown) formed in the control valve housing.

The circumferential exterior surface of valve spool 12 is formed with a plurality of inlet slots 40 which angularly correspond to input ports 28 formed through first lands 26a of valve sleeve 14. In addition, valve spool 12 is also formed to include an identical plurality of return slots 42 which are aligned in an alternating relationship relative to inlet slots 40 and are angularly aligned with second lands 26b. Exhaust ports 44 provides fluid communication between return slots 42 and internal chamber 46 for permitting the returning load flow to be delivered to a reservoir (not shown) in a conventional manner.

In operation, hydraulic fluid enters valving sub-assembly 10 from the housing input port (not shown) via circumferential groove 30 and the plurality of radial input ports 28 formed in valve spool 12. Fluid then flows through the identically numbered plurality of inlet slots 40 formed in valve spool 12 to the identically numbered pluralities of first and second output slots 24a and 24b, respectively, formed in valve sleeve 14 via first and second input flow control orifices 50a and 50b, respectively. Therefore, any load flow demanded by the power steering system is delivered through one set of first and second output ports 32a and 32b, respectively, and its corresponding one of first and second circumferential grooves 38a and 38b, respectively, and its respective housing output port (not shown) to its respective one of load lines 34a and 34b. Concurrently, the flow returning from the other of load lines 34a and 34b enters the control valve through the other of the housing output ports, the other of first and second circumferential grooves 38a and 38b, respectively, and the other of first and second output ports 32a and 32b, respectively. Thereafter, the returning flow passes through first and second return flow control orifices 52a and 52b, respectively, to the identically numbered plurality of return slots 42. Finally, the returning fluid flows through exhaust ports 44 and an internal chamber 46 wherefrom it flows through a housing return port (not shown) to the reservoir. In addition to the above, means can be provided for permitting a parasitic leakage flow to occur between first and second valve output slots 24a and 24b, respectively. Preferably, parasitic leakage slots 54 can be formed in valve spool 12 which define one or more sets of parasitic orifices 56a and 56b, respectively, with valve output slots 24a and 24b.

Figure 3A:
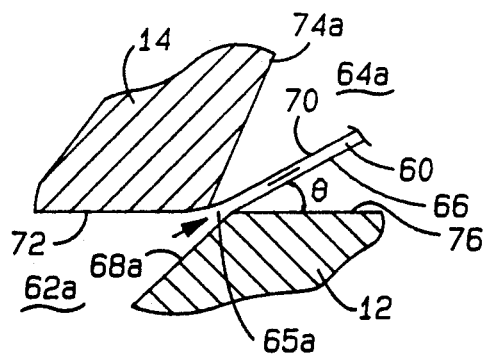
FIGS. 3A and 3B are partial sectional views illustrating the boundary "streamlines" formed by the flow control orifices defined within a "prior art" control valve.
Figure 3B:
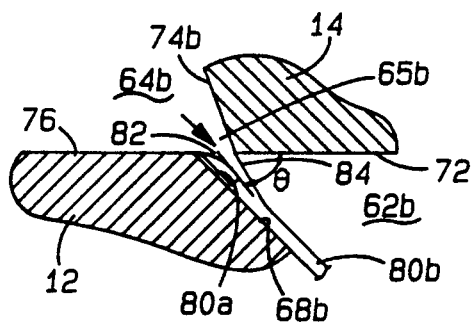

As previously described in reference to SAE Paper 880707 and U.S. Pat. No. 4,651,551, it is known in the prior art to form the contour of the input and return flow control orifices by utilizing chamfered wall surfaces on the slots formed in the valve spool in association with nominally radial wall surfaces on the valve sleeve slots. An example of this conventional valving construction is shown in FIGS. 3A and 3B. More particularly, FIG. 3A depicts a "jet" 60 of fluid flowing out of valve spool inlet slot 62a and into valve sleeve output slot 64a through a flow control orifice 65a. Jet 60 has a boundary streamline 66 emanating from chamfered surface 68a of inlet slot 62a and a boundary streamline 70 emanating from inner circumferential surface 72 of valve sleeve 14 for defining a jet angle $\theta$ less than 50°. As can be seen in FIG. 3A, jet 60 flows into valve sleeve output slot 64a without impinging upon either one of nominally radial slot wall 74a of valve sleeve output slot 64a or external circumferential surface 76 of valve spool 12.

With reference to FIG. 3B, a flow control orifice 65b is shown which is configured to be "geometrically" balanced with respect to flow control orifice 65a. More particularly, FIG. 3B depicts a "jet" 80 of fluid flowing out of valve sleeve output slot 64b and into valve spool return slot 62b wherein boundary streamline 82 emanates from external circumferential surface 76 of valve spool 12 and boundary streamline 84 emanates from nominally radial slot wall 74b of valve sleeve 14'. As is known, jet 80 has a jet angle $\theta$ of about 55° and thus impinges upon chamfered surface 68b of valve spool return slot 62b. According to principles described in the book entitled JETS, WAKES AND CAVITIES, jet 80 splits into a bifurcated flow pattern having sub-jets 80a and 80b that are bounded by chamfered surface 68b. The flow direction of sub-jet 80a is reversed so as to flow "back" toward boundary streamline 82. This action tends to deflect jet 80 further away from chamfered surface 68b, thereby reducing the overall transverse width of jet (80) which, in turn, reduces the effective flow coefficient of jet 80 to as little as 70% of the value associated with jet 60. Thus, because the pressure drop associated with orifice flow is determined by a square law relationship, equal rates of fluid flow through jets 80 and 60 can result in pressure loses varying from one another by, for example, as much as 2:1.

Figure 4A:
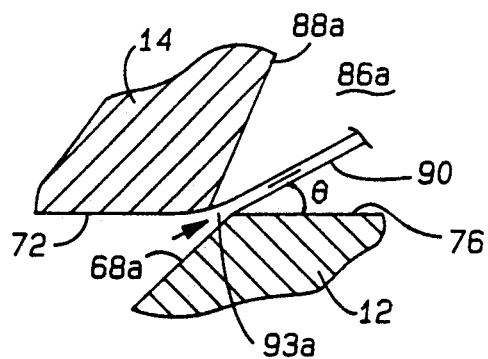
FIGS. 4A and 4B are partial sectional views illustrating the boundary "streamlines" formed by the flow control orifices associated with the improved valving sub-assembly shown in FIG. 1.
Figure 4B:
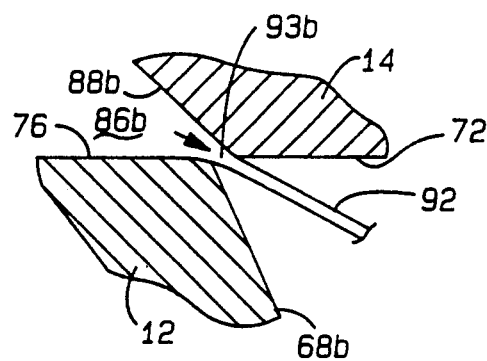

With reference now to FIGS. 4A and 4B, valve sleeve output slots 86a and 86b are shown that are formed according to a preferred embodiment of the present invention. In valve sleeve output slots 86a and 86b, slot walls 88a and 88b, respectively, are each formed at similar angles to chamfered wall surfaces 68a and 68b, respectively, so as to be largely parallel thereto. The flow passage formed by circumferential surface 72 and wall surface 68a and the flow passage formed by circumferential surface 76 and wall surface 68b form flow control orifices with nominally uniform converging angles. Thus, jets 90 and 92 which issue from flow control orifices 93a and 93b, respectively, are oriented at similar set angles (of less than 50°) and do not impinge upon either of slot wall 88a or chamfered surface 68b, respectively. Furthermore, jets 90 and 92 have similar flow coefficients and thus, nominally identical pressure loss values.

Figure 5A:
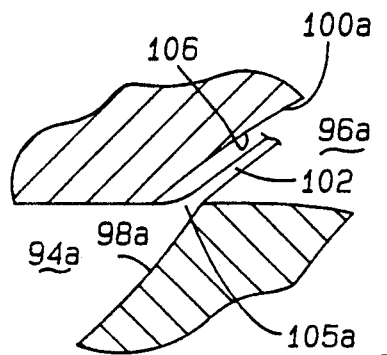
FIGS. 5A and 5B are partial sectional views illustrating the boundary "streamlines" formed by the flow control orifices associated with a valving sub-assembly constructed according to an alternative preferred embodiment of the present invention.
Figure 5B:
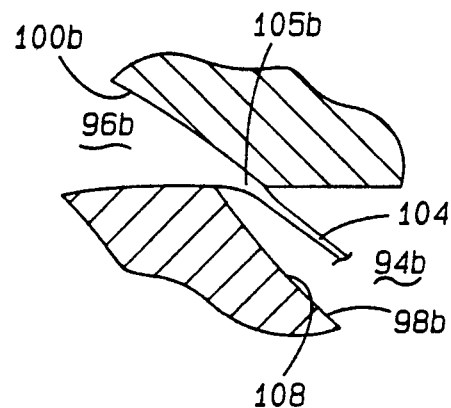

With reference now to FIGS. 5A and 5B, valve spool inlet slots 94a and return slots 94b, and valve sleeve output slots 96a and 96b are shown formed according to another preferred embodiment of the present invention. Each of valve spool inlet slots 94a and return slots 94b and valve sleeve slots 96a and 96b are formed in the manner of transverse "woodruff key" slots. As such, curvalinear valve spool slot walls 98a and 98b, and valve sleeve slot walls 100a and 100b are all formed with similar exit angles. Thus, jets 102 and 104, which issue from input and return flow control orifices 105a and 105b, respectively, are disposed at similar jet angles (of less than 50°) and do not impinge upon adjacent portions 106 or 108 of either of curvalinear slot walls 100a or 98b, respectively. Therefore, jets 102 and 104 have similar flow coefficients and nominally identical pressure drop values.

The valve spool inlet and return slots 94a and 94b, respectively, shown in FIGS. 5A and 5B can be formed via metal removal using woodruff key style cutters in a known manner. Alternately, they may be formed by another known process called roll forming wherein their shape is produced via upsetting the surface of a valve spool blank with rolling or translating die sets. In addition, valve sleeve output slots 96a and 96b are usually formed via an axially oriented process known as broaching. The broaching process produces open ends on the output slots which must then be closed in order to seal valve sleeve output slots 96a and 96b in a pressure-tight manner.

One known method of closing the ends of the slots is to fabricate very shallow slots, upset their ends inward, and then form a final bore leaving the finished valve sleeve slots. A disadvantage associated with this method is the relatively small size of the valve sleeve slots and the excessive pressure drops associated with fluid flow therein. Another known method is to counterbore each end of valve sleeve 14, press sealing rings into each end, and then form a final bore. The disadvantage of this method is the presence of the sealing rings themselves. It may be desirable to have at least one end surface of valve sleeve 14 formed integrally with one smooth transverse surface 108 (depicted in FIG. 1) as, for instance, in the case where the surface is utilized as a thrust bearing surface.

Figure 6A:
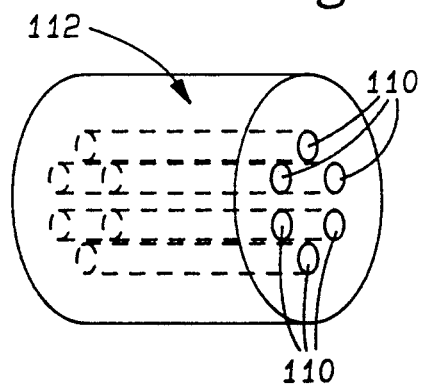
FIGS. 6A, 6B and 6C are perspective views illustrating a method of fabrication for forming valve sleeve slots having a uniform transverse radius.
Figure 6B:
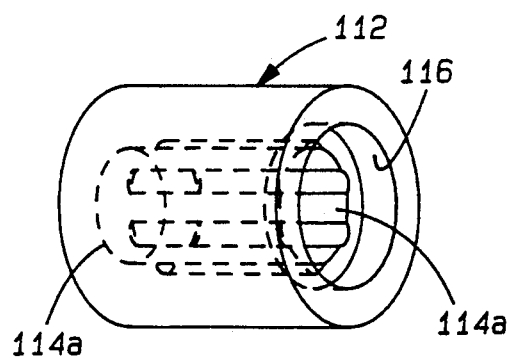
Figure 6C:
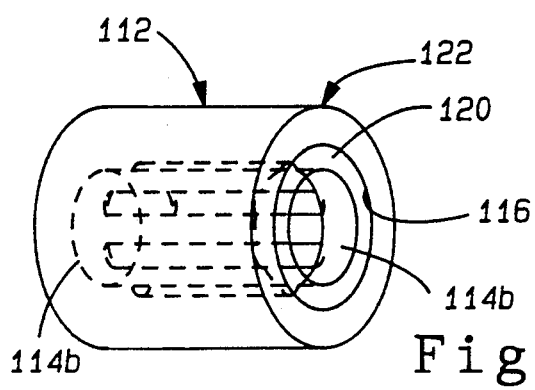

With reference now to FIGS. 6A, 6B and 6C there is illustrated a method of fabricating valve sleeve output slots 96a and 96b wherein only one sealing ring is required. More particularly, a plurality of radially aligned and axially oriented cylindrical bores 110 are formed in a valve sleeve blank 112 as shown in FIG. 6A. Bores 110 are circular in cross-section and are formed as blind holes. One known method for accurately forming such blind holes is via a process known as "gun-drilling" wherein the "drill" is actually a form of boring tool that is accurately guided and is provided with an internal passage for conveying lubricating fluid to its working end. As shown in FIG. 6B, an intermediate longitudinal bore 114a and counterbore 116 are then formed in valve sleeve blank 112. Next, a sealing ring 120 is pressed into counterbore 116. Finally, an enlarged final bore 114b is formed through both valve sleeve blank 112 and sealing ring 120 to define valve sleeve assembly 122 as shown in FIG. 6C. The other fabricated details associated with valve sleeve 14, such as the various grooves and holes mentioned hereinabove, may be formed at any time in the manufacturing process but are not shown in FIGS. 6A, 6B or 6C for reasons of clarity.

The foregoing discussion discloses and describes merely exemplary embodiments of the present invention. One skilled in the art will readily recognize from such discussion, and from the accompanying drawings and claim, that various changes, modifications and variations can be made therein without departing from the true spirit and fair scope of the invention as defined in the following claims.

What is claimed is:

1. A control valve comprising:
   a valve sleeve having a plurality of alternating first and second slots formed in a circumferential surface thereof;
   a valve spool selectively rotatable within said valve sleeve and having a plurality of alternating third and fourth slots formed on a circumferential surface thereof;
   a first flow passage provided for permitting a first fluid jet to issue from said third slots to between a wall portion of either of said first and second slots, and said circumferential surface of said valve sleeve, said first flow passage defined by said circumferential surface of said sleeve and a wall portion of said third slots, said circumferential surface tangentially intersecting said wall portion of said third slots at a first predetermined converging angle, said wall portion of said first and second slots being generally parallel to said wall portions of said third slots, said first fluid jet issuing at a first jet angle with respect to said circumferential surface of said valve spool;

a second flow passage provided for permitting a second fluid jet to issue from either of said first and second slots between a wall portion of said fourth slot, and said circumferential surface of said valve spool, said second flow passage defined by said circumferential surface of said spool and a wall portion of one of said first and second slots, said circumferential surface tangentially intersecting said wall portion of said first and second slots at a second predetermined converging angle, said wall portion of said fourth slot being generally parallel to said wall portions of said first and second slots, said second fluid jet issuing at a second jet angle with respect to said circumferential surface of said valve sleeve said first and second predetermined converging angles being generally the same such that said jet angles are generally the same.

2. The control valve of claim 1 wherein pressure losses associated with said first and second jets are substantially equal in value.

3. The control valve of claim 1 wherein said second jet angle is selected such that said second jet issuing through said second flow passage does not impinge upon a surface in juxtaposition to said circumferential surface of said valve spool.

4. The control valve of claim 1 wherein said first and second slots are first and second output slots, respectively, said third slots are inlet slots and said fourth slots are return slots.

5. The control valve of claim 4 wherein the flow of fluid through said first and second flow passages is regulated as a function of the relative rotation between said valve spool and said valve sleeve.

6. The control valve of claim 1 wherein each of said first and second slots have wall surfaces that are generally parallel to chamfered edge wall surfaces of said third and fourth slots.

7. The control valve of claim 1 wherein said first, second, third and fourth slots are configured as transversely extending key slots having curvalinear slot walls for forming substantially identical first and second jet angles.

8. The control valve of claim 1, wherein said circumferential surfaces and wall portions are positioned such that each of said first and second jet angles is less than fifty degrees.

* * * * *